United States Patent [19]

Price et al.

[11] 4,145,645
[45] Mar. 20, 1979

[54] SPEED CONTROL MEANS FOR SQUIRREL-CAGE MOTOR

[75] Inventors: Lester A. Price, Greenfield; Gerold E. Schmid, Brookfield; Lawrence A. Millonzi, Milwaukee, all of Wis.

[73] Assignee: Harnischfeger Corporation, W. Milwaukee, Wis.

[21] Appl. No.: 731,926

[22] Filed: Oct. 13, 1976

[51] Int. Cl.² ............................ H02P 3/24; H02P 7/48
[52] U.S. Cl. ...................................... 318/762; 318/777; 361/29
[58] Field of Search ............... 318/209, 210, 211, 212, 318/224 R, 224 A, 225 R, 484, 201, 204; 361/28, 29

[56] References Cited
U.S. PATENT DOCUMENTS

| | | | |
|---|---|---|---|
| 2,677,087 | 4/1954 | Willmott | 318/212 |
| 2,740,932 | 4/1956 | King | 318/212 |
| 2,793,339 | 5/1957 | Rhyne, Jr. | 318/224 R |
| 2,816,258 | 12/1957 | Norman | 318/224 R |
| 2,840,772 | 6/1958 | Seely | 318/225 R |
| 2,847,630 | 8/1958 | Holt et al. | 318/212 |
| 3,011,594 | 12/1961 | Borden | 318/224 R |
| 3,166,701 | 1/1965 | Bohn | 318/212 |
| 3,281,633 | 10/1966 | Jensen | 318/212 |
| 3,368,073 | 2/1968 | Baughman | 318/225 R |
| 3,721,832 | 3/1973 | Lee | 361/29 |
| 3,786,327 | 1/1974 | Dyer | 318/225 |
| 3,864,611 | 2/1975 | Chang | 318/484 |
| 3,919,600 | 11/1975 | Sons | 361/28 |

Primary Examiner—Gene Z. Rubinson
Assistant Examiner—Eugene S. Indyk
Attorney, Agent, or Firm—James E. Nilles

[57] ABSTRACT

There is disclosed a squirrel-cage motor for a winch drive or other application and control means for operating the motor in hoist or lower directions at any one of a plurality of speeds in either direction. The motor and winch are provided with a load brake. In one embodiment, the stator comprises two stator windings having different numbers of poles to provide high speed (fewer poles) and low speed (more poles) windings. The control means comprises a direct current power source, an alternating current power source, means for connecting the sources to the stator windings so that different speed points and braking operations are achieved, and means for operating the load brake. Low speed results from simultaneously energizing the low speed winding and the high speed winding from the alternating current power source and the direct current power source, respectively. Intermediate speed results from energizing only the low speed winding from the alternating current power source. High speed results from energizing only the high speed winding from the alternating current power source.

The control means includes time delay means to prevent connection of the alternating current source to the winding previously energized from the direct current source until arcing across a direct current contactor in the control means ceases during transition from low speed to higher speed.

9 Claims, 9 Drawing Figures

SPEED CONTROL MEANS FOR SQUIRREL-CAGE MOTOR

BACKGROUND OF THE INVENTION

1. Field of Use

This invention relates generally to speed control means for squirrel-cage reversible electric motors such as are used on winches and overhead travelling cranes.

2. Description of the Prior Art

A typical heavy duty electric winch or a hoist on an overhead travelling crane used in industry for general lifting applications comprises a motor-driven electrically-braked hoist drum on which a load-handling device is reeved. The motor control relays and contactors are suitably mounted in a control panel adjacent the hoist motor and are actuated by the hoist operator by means of a push-button type pendant which hangs down from the control panel or from a master switch. Such hoists typically use either single-speed reversible or two-speed reversible squirrel-cage motors for the hoist drum drive. Typically, such a two-speed squirrel-cage motor has a double wound stator and the ratio between the number of poles in the high speed and the low speed windings determines the speed ratio of the motor; ratios of 1 to 3 or 4 being commonly used. To obtain more than two speed points with such hoists, it was heretofore necessary either to use a wound rotor motor (instead of a squirrel-cage motor) and a complex arrangement of resistors and contactors, or to use a small single-speed "pony" motor as an adjunct to the main squirrel-cage hoist motor and to provide necessary gearing and clutching therefor. Both of these expedients are complex, trouble-prone and costly.

SUMMARY OF THE INVENTION

In accordance with the invention, there is provided a squirrel-cage reversible electric motor such as is used for a winch drive, but which could have other utility, and control means therefor for operating the motor in hoist or lower directions at any one of a plurality of speed points. The motor and winch are provided with a load brake. In one embodiment, the stator comprises two stator windings having different numbers of poles to provide a high speed winding (fewer poles) and a low speed winding (more poles) in one magnetic circuit. In another embodiment, the stator comprises one low speed stator winding and also another low speed winding and a high speed stator winding to thereby provide two or more magnetic circuits with at least one stator winding for each circuit. Any speed ratio disclosed herein is preferred for the embodiment of the invention shown (a winch drive) but speed ratios could be altered to suit particular applications by changing the ratio of the number of poles in the windings. The control means comprises a push-button actuator or a master switch to enable motor operation in raise or lower modes at any of a plurality of speed points in either mode. In the embodiment showing two windings, three speed points are disclosed. In the embodiment showing three windings, four speed points are disclosed.

The control means or system also includes a source of three-phase alternating current for operating the motor and energizing other components; a source of direct current, such as a full-wave rectifier energized from the alternating current source; raise and lower contactors for connecting the motor for rotation in the desired direction; low speed and high speed contactors for connecting the alternating current source to the appropriate motor windings; a direct current contactor for connecting the direct current source to the motor windings; timers and relays for proper sequencing; and Weston-type load brake means in the winch gear drive.

THREE SPEEDS

To provide a slow first point motor speed (on the order of 100 RPM), the control means simultaneously applies alternating current to a low speed winding and direct current to a high speed winding of the same or of a different magnetic circuit. To provide an intermediate second point motor speed (on the order of 450 RPM), the control means applies alternating current to a low speed winding only. To provide a high third point motor speed (on the order of 1800 RPM), the control means applies alternating current to a high speed winding only.

The control system can utilize a two or four element (i.e., push-button) actuated control means to obtain said speeds. The two element control system includes first time delay means to prevent application of alternating current to the high speed winding while it is still energized by direct current due to arcing across the direct current contactor terminals during the transition from first point to higher point speeds. The control means also includes means to momentarily apply direct current to the high speed winding during the transition from third point to lower points of speed to cause dynamic braking to decelerate the motor. Dynamic braking offers smoother deceleration than is obtained with a conventional two speed motor utilizing regenerative braking of the low speed winding to effect deceleration.

The four element system includes first time delay means to prevent application of alternating current to the high speed winding while it is still energized by direct current due to arcing across the direct current contactor terminals during the transition from first point to higher point speeds. The transition from third point speed to lower points of speed is accomplished through regenerative braking by applying alternating current to a low speed winding.

FOUR SPEEDS

To provide a slow first point motor speed (on the order of 100 RPM), the control means simultaneously applies alternating current to the low speed winding or connection of one magnetic circuit and direct current to a winding (the high speed winding if more than one winding is provided) of the second magnetic circuit. To provide an intermediate second point motor speed (on the order of 300 RPM), the control means applies alternating current to a low speed winding of one of the magnetic circuits only. To provide an intermediate third point motor speed (on the order of 900 RPM), the control means applies alternating current to the low speed winding of the second magnetic circuit only. To provide a fourth point motor speed (on the order of 1800 RPM), the control means applies alternating current to the high speed winding or configuration of the second magnetic circuit only.

The control system uses a two element actuated control means to obtain said speeds. A first time delay means is used to prevent application of alternating current to the winding still energized by direct current due to arcing across the direct current contactor terminals during the transition from first point to higher point speeds. A second time delay means is used to prevent energizing the fourth speed point winding until the motor has accelerated on the third speed point winding.

A third time delay means is used to prevent regenerative braking in the first point speed configuration by delaying application of direct current to the low speed winding or connection until the motor has decelerated to near first point speed.

Regenerative braking is accomplished by applying alternating current to the low speed winding in the second magnetic circuit when making the transition from the fourth speed point to the third speed point.

DESCRIPTION OF PREFERRED EMBODIMENTS

Figure 1:
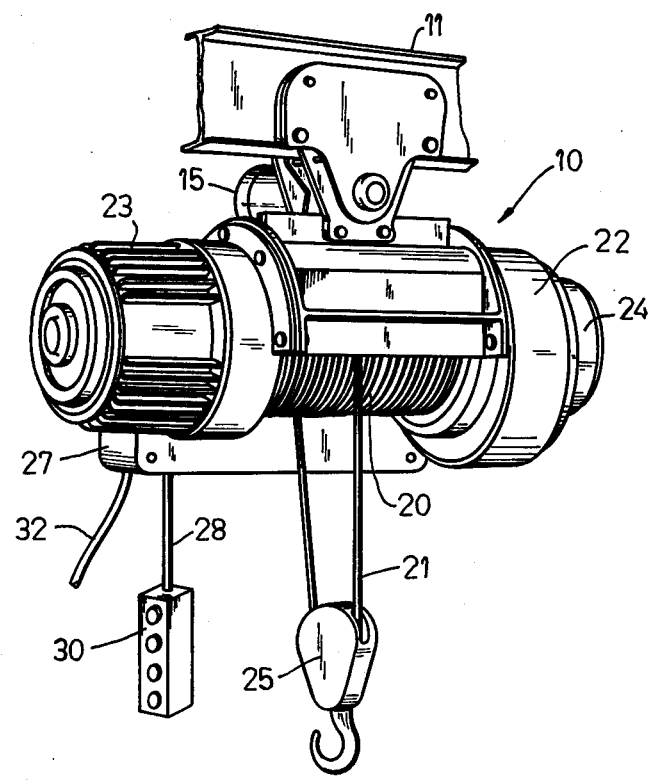
FIG. 1 is a perspective view of an electric winch or hoist on an overhead travelling crane having speed control means in accordance with the invention for its hoist drive motor.

Referring to FIG. 1, an electric winch or overhead hoist 10 having motor speed control means in accordance with the invention is shown mounted on an overhead rail 11 along which it can travel in opposite directions.

Figure 2:
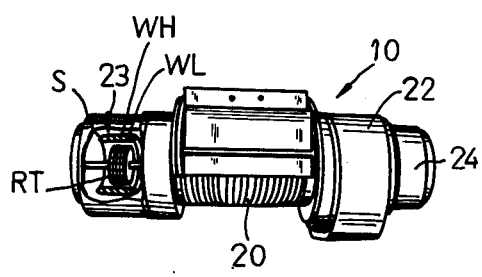
FIG. 2 is a schematic view, partly in cross section, of the winch of FIG. 1 showing it as having a motor with a single magnetic circuit including a low speed winding and a high speed winding.
Figure 3:
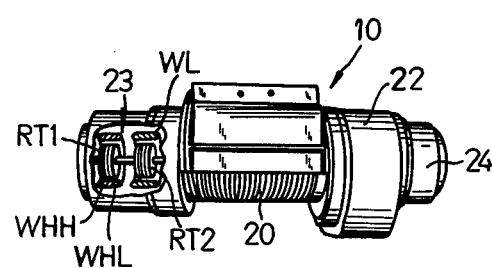
FIG. 3 is a view similar to FIG. 2 showing a motor with two separate magnetic circuits including a low speed winding in one circuit and a low speed winding and high speed winding in the other circuit.
Figure 4:
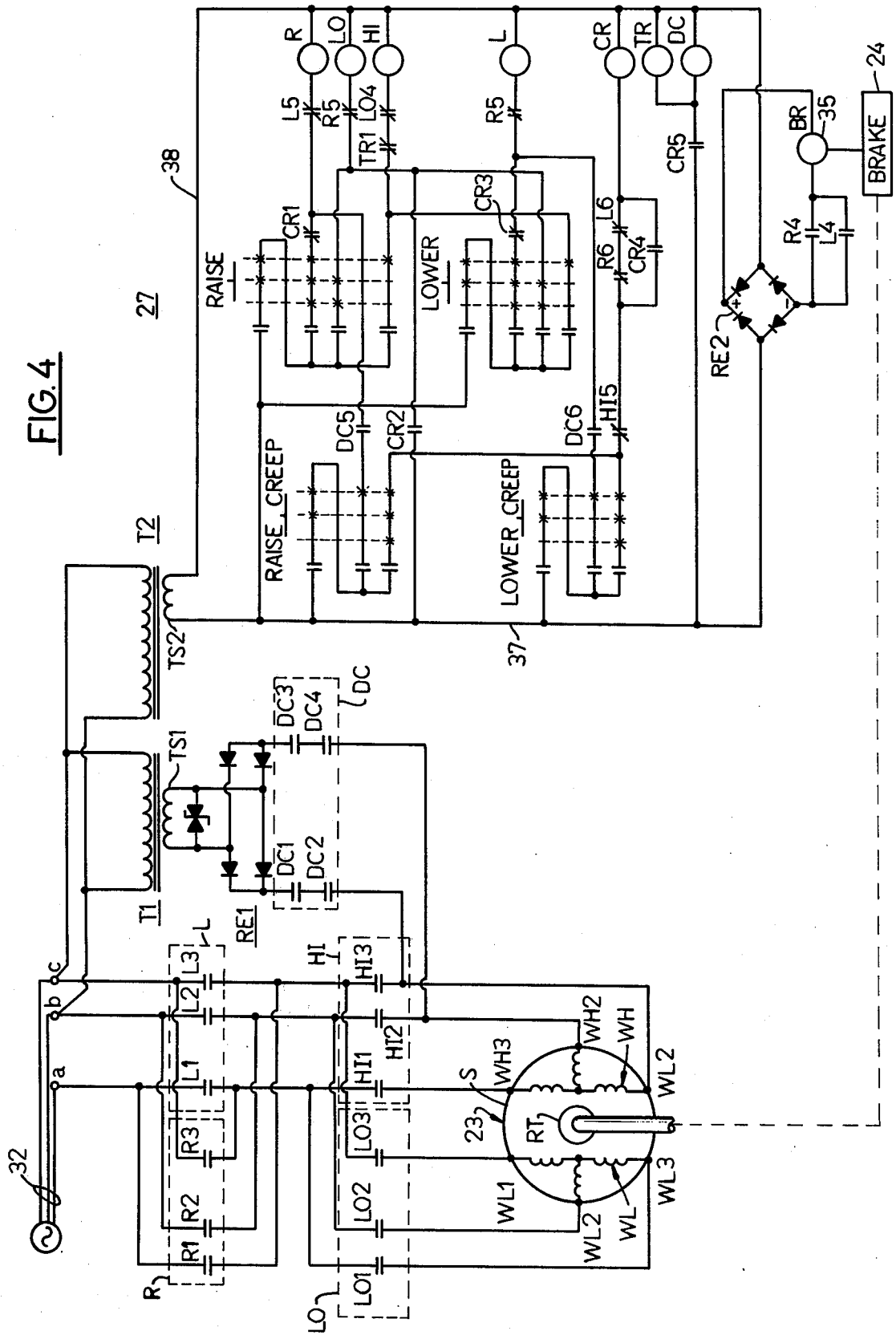
FIGS. 4 and 5 are schematic circuit diagrams of the speed control means for the hoist drive motor shown in FIG. 2.
Figure 5:
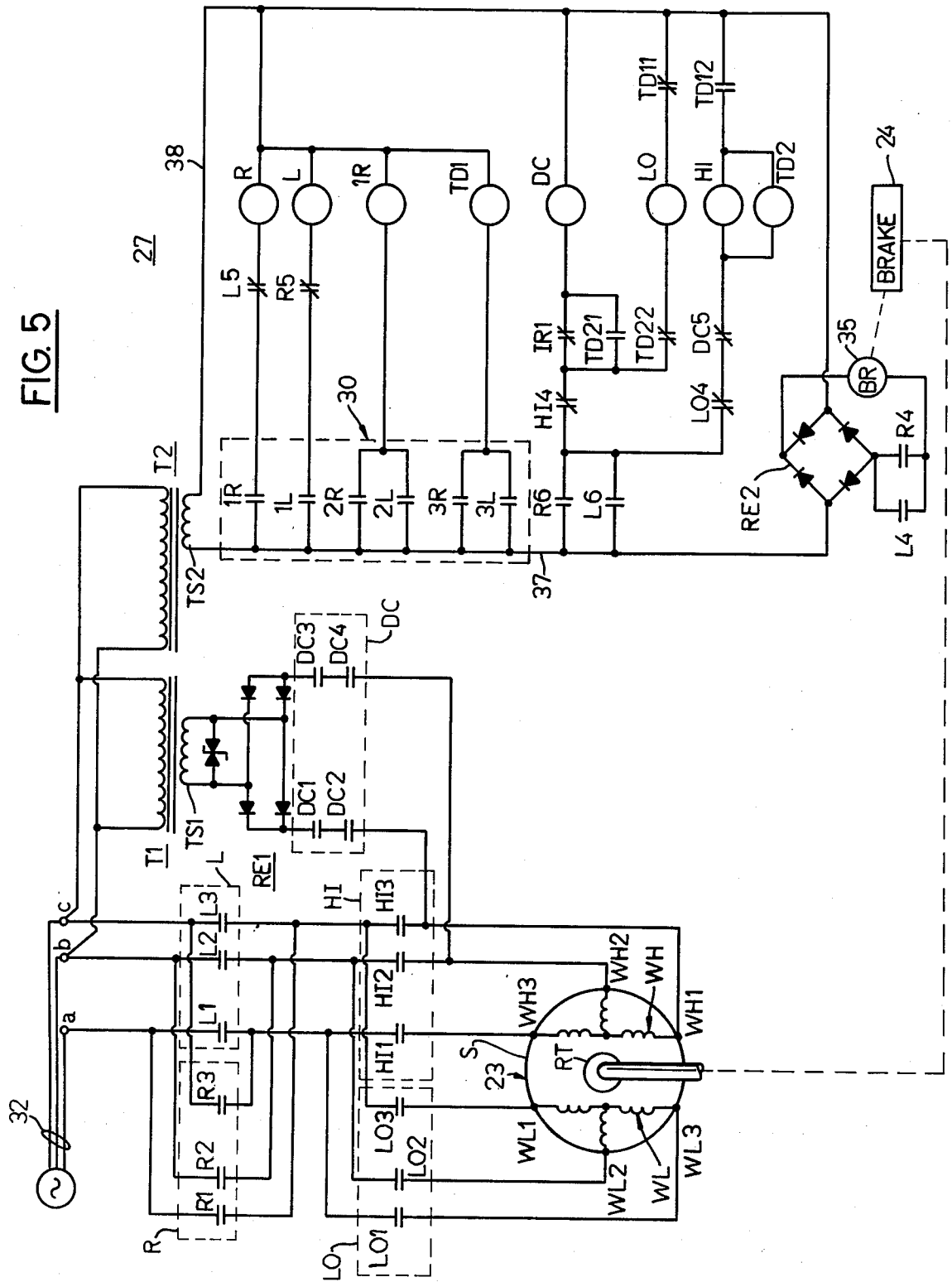
Figure 6:
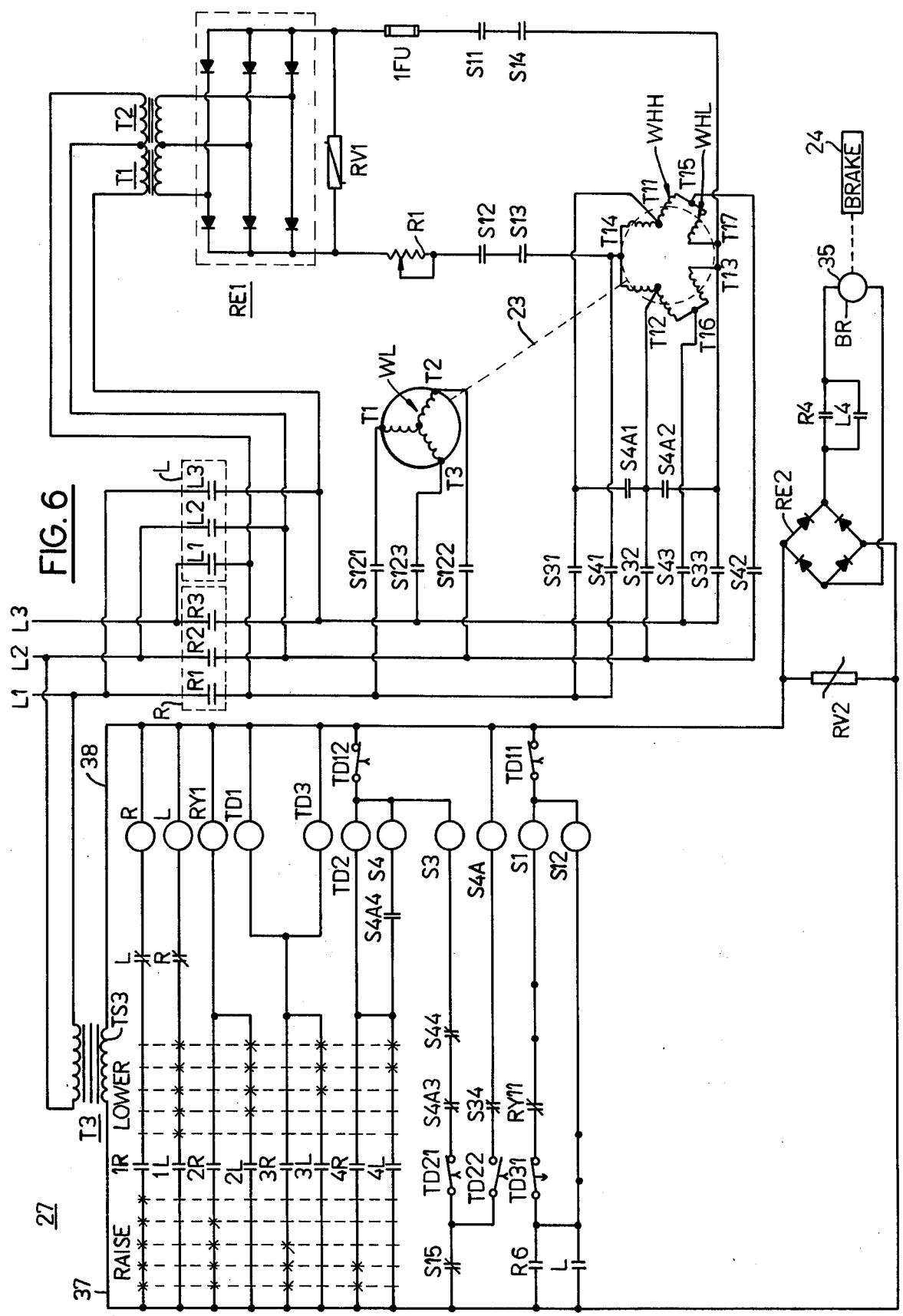
FIG. 6 is a schematic circuit diagram of the speed control means for the hoist drive motor of FIG. 3.

Hoist 10 comprises a hoist drum 20 having a load handling device 21 attached for winding thereon and the line is reeved about a hooked pulley type load block 25. Drum 20 is rotatable in either the hoist or lower directions by an electric motor 23. Motor 23 is a multi-speed squirrel-cage reversible electric motor having a single magnetic circuit as shown in FIGS. 2, 4, and 5 or having a double magnetic circuit as shown in FIGS. 3 and 6, each circuit having one or more stator windings, and each stator winding having a different number of poles. Motor 23 is operated by speed control means in accordance with the invention and has an electromechanical brake 24 and a mechanical load brake 22.

Hoist 10 may take the general form of a hoist shown in detail on pages 4 and 5 (and elsewhere) in Bulletin H-75-6 published by and available from the Harnischfeger Corporation, Milwaukee, Wisconsin 53246.

Hoist 10 also comprises an enclosed motor control panel 27, supported by the housings of the hoist motor 23 and hoist brake 25, which contains various motor control components such as contactors and relays, as hereinafter described. As FIG. 4 shows, control panel 27 comprises three main power supply terminals a, b, and c which are energized by a power supply cable 32 (also shown in FIG. 1) from a suitable source of three phase 60 Hertz alternating current electric power (on the order of 460 volts). A push-button type control pendant 30 for use by the hoist operator (FIG. 1) to effect operation of hoist 10 is provided at the lower end of a control cable 28 which depends from control panel 27. This push-button type control is preferred for the embodiment of the invention but other types (i.e., a master switch) could be used.

THREE SPEEDS

Referring to FIGS. 2 & 4, hoist motor 23 is a double-wound squirrel-cage reversible electric motor having, for example, a laminated stators, two stator windings WH and WL energizable as hereafter explained, and a laminated slotted rotor R having electrically conductive interconnected bars therein. Application of polyphase alternating current to either of the stator windings WH or WL produces a rotating magnetic field, the speed of which is a function of the number of poles in each winding and the frequency of the supply voltage. In the embodiment shown, the windings WH and WL are each internally star-connected and comprise, for example, four and sixteen poles, respectively, to provide synchronous speeds of 1800 and 450 rpm, respectively, when energized with three-phase 60 Hertz alternating current. This four to one speed ratio or differential is preferred in the present embodiment, but some other ratio could be provided by changing the number of poles or the frequency. The windings WL and WH are low speed and high speed windings, respectively, and are provided with connection terminals WL1, WL2, WL3, and WH1, WH2, WH3, respectively.

Figure 7:
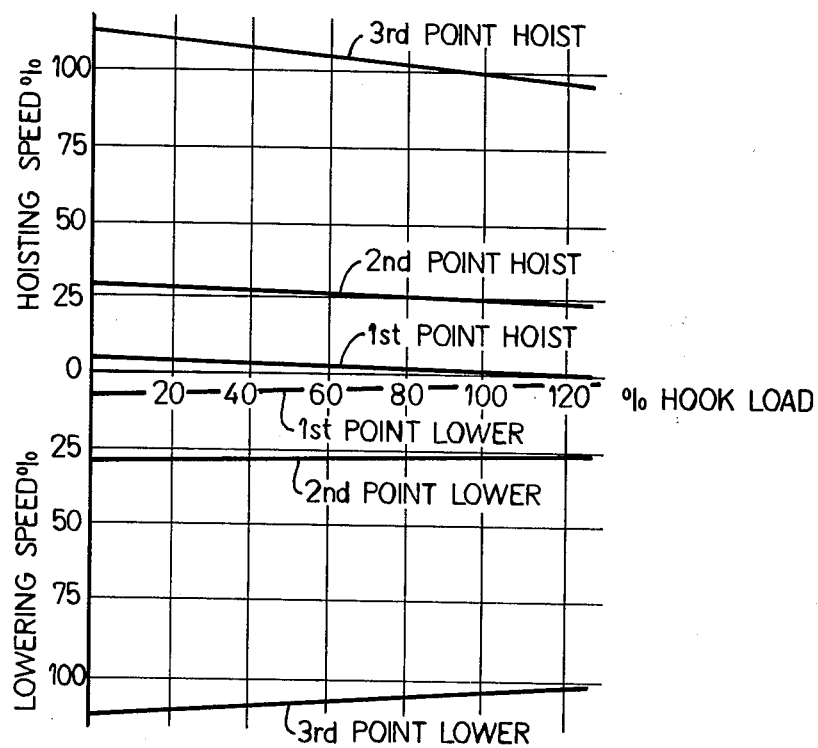
FIGS. 7, 8 and 9 are graphs depicting specific speed-load characteristics of the systems shown in FIGS. 4, 5, and 6, respectively.

The speed control means for operating hoist motor 23 in accordance with the invention enables operation of hoist motor 23 at any of three speeds (low, medium or high) in either the raise or lower directions. The graph in FIG. 7 shows hoist speed plotted against percentage of hook load at each of the three speeds during both raise and lower operations.

As FIG. 4 shows, controller 27 includes two step-down type power supply transformers T1 and T2, each of which has its primary connected across the power supply terminals b and c. Transformer T1 has its secondary winding TS1 connected across the input terminals of a solid state bridge type full-wave rectifier RE1 which is adapted to supply winding WH of motor 23 with direct current as hereinafter explained. Transformer T2 has its secondary winding TS2 connected to supply operating power to motor brake 24 and to contactor and relays, as hereinafter described.

As FIG. 4 further shows, the terminals of the windings WH and WL of hoist motor 23 are adapted for connection in various combinations and sequences, hereinafter described, to the alternating power supply terminals a, b, and c by means of the normally open contacts of the contactors R, L, L0, HI. The contactor DC effects connection and disconnection of rectifier RE1 to a portion of the winding WH of motor 23.

THREE-SPEEDS: FOUR ELEMENT CONTROL MEANS

As FIG. 4 shows, secondary winding TS2 has its output terminals connected to two bus lines 37 and 38 which supply power to the operating coils of the following contactors, brake, and relays: a raise contactor R, a lower contactor L, a relay CR, a first time delay relay TR, a direct current contactor DC, a brake coil BR, a low speed contactor LO, and a high speed contactor HI. The operating coils of the contactors and relays are connected across the bus lines 37 and 38 as shown in FIG. 4 and are in series with contacts hereinafter identified and in series with normally open push-button switches, hereinafter identified, which are understood to be physically mounted on the operator's control pendant 30 and which can be of any conventional type.

The time delay relay TR is an "off" delay relay of a conventional adjustable type and is adapted to maintain its contacts in their former state for a short interval of time after its coil is deenergized. The time delay interval of the relay TR is, for example, adjustable between 0.2 and 1.0 seconds.

Controller 27 operates in response to actuation by the hoist operator of the control switches 1, 2, 3, 5, on pendant 30. It is to be understood that these control switches are of a conventional normally open bush-button type and that depression of a push-button (as shown) closes and/or opens the switch (per diagram indication) and release of the push-buttom opens the switch.

THREE SPEEDS: TWO ELEMENT CONTROL MEANS

As FIG. 5 shows, secondary winding TS2 has its output terminals connected to two bus lines 37 and 38 which supply power to the operating coils of the following contactors, brake, and relays: a raise contact R, a lower contactor L, a relay IR, a first time delay relay TD1, a direct current contactor DC, a brake coil BR, a low speed contactor LO, a high speed contactor HI, and a second time delay relay TD2. The operating coils of the contactors and relays R, L, IR, and TD1 are connected across the bus lines 37 and 38 as shown in FIG. 5 in series with normally open push-button switches, hereinafter identified, which are understood to be physically mounted on the operator's control pendant 30 and which can be of any conventional type. The operating coils of the contactors DC, LO, HI and the relay TD2 are connected across the bus lines 37 and 38, as shown in FIG. 5, in series with contacts hereinafter identified.

The time delay relay TD1 is an "on" delay relay of a conventional adjustable type and is adapted to maintain its contacts in their former state for a short interval of time after its coil is energized. The time delay relay TD2 is an "off" delay relay of a conventional adjustable type and is adapted to maintain its contacts in their former state for a short interval of time after its coil is deenergized. The time delay intervals of the relays TD1 and TD2 are, for example, adjustable between 0.2 and 1.0 seconds.

Controller 27 operates in response to actuation by the raise operator of the control switches 1R, 1L, 2R, 2L, 3R, 3L on pendant 30. It is to be understood that these control switches are of a conventional normally open push-button type and that depression of a push-button (not shown) closes the switch and release of the push-button opens the switch. It is to be further understood that the switches are so arranged that no raise switches 1R, 2R, 3R can be closed while any lower switches 1L, 2L, 3L are closed and vice-versa. Furthermore, closure of switch 2R presupposes that switch 1R remains closed and closure of switch 3R presupposes that switches 1R and 2R both remain closed. Similarly, closure of switch 2L presupposes that switch 1L remains closed and closure of switch 3L presupposes that switches 1L and 2L both remain closed.

FOUR SPEEDS: TWO ELEMENT CONTROL MEANS

Referring to FIGS. 3 and 6, hoist motor 23 is a squirrel-cage reversible electric motor having, for example, two magnetic circuits and two stator windings WHH; WHL; and WL energizable as hereafter explained, and laminated slotted rotors RT1 and RT2 having electrically conductive interconnected bars therein. Application of polyphase alternating current to either of the stator windings WHH; WHL; or WL produces a rotating magnetic field, the speed of which is a function of the number of poles in each winding and/or the connection, and the frequency of the supply voltage. In the embodiment shown, the high speed windings WHH and WHL are reconnectable per contactors S3 and S4/S4A to provide synchronous speeds of 1800 and 900 RPM, respectively, when energized with three-phase 60 Hertz alternating current. This two to one speed ratio or differential is preferred in the present embodiment, but some other ratio could be provided by having another winding with a different number of poles. The low speed winding WL provides a synchronous speed of 300 RPM.

Figure 9:
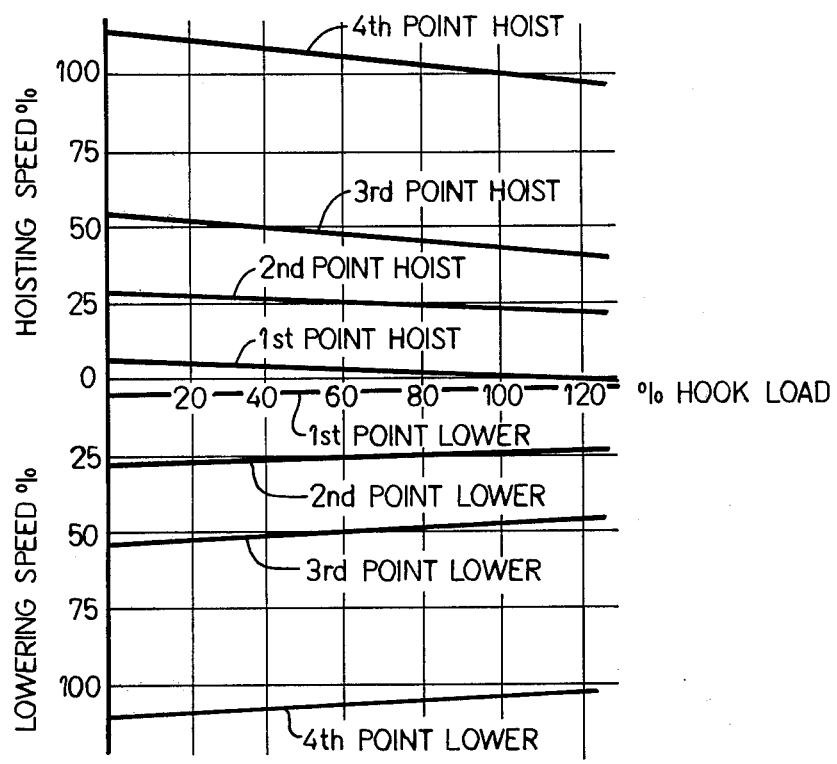

The speed control means for operating hoist motor 23 in accordance with the invention enables operation of hoist motor 23 at any of four speeds (creep, low, medium or high) in either the raise or lower directions. The graph in FIG. 9 shows hoist speed plotted against percentage of hook load at each of the four speeds during both raise and lower operations.

As FIG. 6 shows, controller 27 includes three step-down type power supply transformers T1, T2, and T3, each of which has its primary connected across the power supply terminals a, b, and/or c. Transformers T1 and T2 have their secondary windings connected across the input terminals of a solid state bridge type full-wave rectifier RE1 which is adapted to supply windings WHH and WHL of motor 23 with direct current as hereinafter explained. Transformer T3 has its secondary winding TS3 connected to supply operating power to motor brake 24 and to contactor and relays, as hereinafter described.

Secondary winding TS3 has its output terminals connected to two bus lines 37 and 38 which supply power to the operating coils of the following contactors, brake, coil, and relays: a raise contactor R, a lower contactor L, relays RY1 and CR1, a first, second and third time delay relays TD1, TD2, TD3, a direct current contactor S1, a brake coil BR, a low speed contactor S12, a medium speed contactor S3, and high speed contactors S4 and S4A. The operating coils of the contactors and relays are connected across the bus lines 37 and 38 as shown in FIG. 6 and are in series with contacts hereinafter identified and/or in series with normally open push-button switches, hereinafter identified, which are understood to be physically mounted on the operator's control pendant 30 and which can be of any conventional type.

As FIG. 6 further shows, the terminals of the windings WHH, WHL and WL of hoist motor 23 are adapted for connection in various combinations and sequences, hereinafter described, to the alternating power supply terminals a, b, and c by means of the normally open contacts of the contactors R, L, S12, S3, S4, S4A. The contactor DC effects connection and disconnection of rectifier RE1 to the winding WH of motor 23.

The time delay relays TD1 and TD2 are "on" delay relays of a conventional adjustable type and are adapted to maintain their contacts in their former state for a short interval of time after their coils are energized. The time delay interval of the relays are for example, adjustable between 0.2 and 1.0 seconds.

The time delay relay TD3 is an "off" delay relay of a conventional adjustable type and is adapted to maintain its contacts in their former state for a short interval of time after its coil is deenergized. The time delay interval of the relay TD3 is for example, adjustable between 0.2 and 1.0 seconds.

Controller 27 operates in response to actuation by the hoist operator of the control switches 1R, 1L, 2R, 2L, 3R, 3L, 4R, 4L on pendant 30. It is to be understood that these control switches are of a conventional normally open push-button type and that depression of a push-button (not shown) closes the switch and release of the push-button opens the switch. It is to be further understood that the switches are so arranged that no raise switches 1R, 2R, 3R, 4R can be closed while any lower switches 1L, 2L, 3L, 4L are closed and viceversa. Furthermore, closure of switch 2R presupposes that switch 1R remains closed, and closure of switch 3R presupposes that switches 1R and 2R both remain closed and closure of switch 4R presupposes that switches 1R, 2R, and 3R remain closed. Similarly, closure of switch 2L presupposes that switch 1L remains closed and closure of switch 3L presupposes that switches 1L and 2L both remain closed, and closure of switch 4L presupposes that switches 1L, 2L, and 3L remain closed.

OPERATION-THREE SPEEDS: FOUR ELEMENT CONTROL MEANS

Referring to FIG. 4, motor 23, brake 24 and the control means thereof operate in the following manner assuming that the terminals a, b, and c and the transformers T1 and T2 are energized and that all switches and contacts are initially in the condition shown in FIG. 2.

First Point Raise

Closure by the operator of the creep raise (first point) push-button contacts 1 and 3 energize timer and relay coils (TR and CR). Timer contacts TR1 open (with no immediate effect) to disable contactor coil HI. CR1 and CR3 contacts open to disable any control by the raise or lower push-button. CR2 contacts close to energize contactor coil LO which closes its contacts LO1-LO3 (with no immediate effect) and opens its contact LO4 to disable contactor coil HI. CR4 contacts close to maintain relay coil CR after contactor coils R or L have been energized. CR5 contacts close to energize contactor coil DC. DC contactor main poles DC1-DC4 close to apply DC excitation to the terminals WH2 and WH1 of winding WH of motor 23. DC contactor interlocks DC5 and DC6 close (with no immediate effect) to enable contactor coils R and L.

Closure by the operator of the creep raise push-button contact 5 energizes contactor coil R which closes its contacts R1-R3 to apply alternating current to the terminals WL1, WL2, WL3 of winding WL of motor 23 from the supply line terminals a, b, c, respectively. Motor 23 is thus energized for low speed operation in the raise direction by a conbination of alternating and direct current and exhibits the speed-torque characteristics indicated by the lines designated "first point raise" in FIG. 4. Contacts R4 close to energize brake coil 35 and release brake 24 on hoist motor 23. Contacts R5 open (with no immediate effect) to disable contactor coil L. Contacts R6 also open with no immediate effect. Upon opening of push-button contacts 1, 3, and 5 by the operator, contactor and relay conditions shown in FIG. 4 are reinstated, motor 23 is deenergized and brake 24 resets.

Second Point Raise

Closure by the operator of the raise (second point) push-button contacts 3, 1, and 2 energize contactor coils R and LO. Contacts R1-3 and LO1-3 close to apply alternating current to the terminals WL1, WL2, WL3 of winding WL of motor 23 from the supply terminals a, b, c, respectively, motor 23 is energized for intermediate speed operation in the hoist direction only by alternating current in winding WL and exhibits the speed-torque characteristics indicated by the line designated "second point hoist" in FIG. 4. Contacts R4 close to energize brake coil 35 and release brake 24 on hoist motor 23. Contacts R5 open (with no immediate effect) to disable contactor coil L. Contacts R6 also open (with no immediate effect) to disable any control by the raise or lower creep push-button. Contacts LO4 open (with no immediate effect) to disable contactor coil HI. Upon opening of push-button contacts 3, 1, and 2 by the operator, contactor and relay conditions shown in FIG. 4 are reinstated, motor 23 is deenergized and brake 24 resets.

Third Point Raise

To proceed to third point raise, the second point push-button contacts 3, 1, and 2 are closed and motor 23 is initially energized as hereinbefore described. Further depressing the push-button to the third position opens contacts 2 and closes contact 5 while 1 and 3 remain closed. Contact 2 opening deenergizes contactor coil LO and opens contacts LO1-3 disconnecting terminals WL1, WL2, WL3 of winding WL from the alternating current source. LO4 contacts close, enabling contactor coil HI. Contact 5 closing energizes contactor coil HI. Contacts HI1-3 close to apply alternating current to the terminals WH1, WH2, WH3 of winding WH of motor 23 from the supply terminals a, b, c, respectively, energizing motor 23 for high speed operation in the hoist direction by alternating current only and exhibiting the speed-torque characteristics indicated by the lines designated "third point raise" in FIG. 7. Upon opening of push-button contacts 1, 2, 3, and 5 by the operator, contactor and relay conditions shown in FIG. 2 are reinstated, motor 23 is deenergized and brake 24 reset.

First, Second, and Third Point Lower

Operation of hoist 10 in the first, second and third point lower modes is similar to that for the corresponding raise modes hereinbefore described, except that the push-buttons lower creep and lower are used instead of raise creep and raise. It is to be noted, however, that since motor 23 operates in the reverse direction during the lower mode, the hoist contacts R1, R2, and R3 and the lower contacts L1, L2, L3 are arranged to effect phase reversal to the appropriate connection terminals on motor 23.

Braking

Regenerative braking from third point to second point and from second point to first point speeds is accomplished by performing the reverse of the heretofore mentioned operations. When a transition from second point to first point is made, contacts R6 and L6 ensure that contactor R or L is open before allowing contactor DC to close.

Timing

In the embodiment of the invention disclosed herein, time delay relay TR is employed to ensure cessation of direct current flow to motor winding WH before application of alternating current thereto. However, other means could be employed for this purpose and such means are within the scope of the present invention.

OPERATION-THREE SPEED: TWO ELEMENT CONTROL MEANS

Referring to FIG. 5, motor 23, brake 24 and the control means thereof operate in the following manner, assuming that the terminals a, b, and c and the transformers T1 and T2 are energized and that all switches and contacts are initially in the condition shown in FIG. 5.

First Point Raise

Closure by the operator of first point (low speed) raise push-button contact 1R energizes raise contactor coil R which closes its hoist contacts R1, R2, R3 with no immediate effect. Coil R also closes its brake contact R4 to energize brake coil 35 and release brake 24 on hoist motor 23. Coil R also opens it auxiliary contact R5 to disable contactor coil L and closes its auxiliary contact R6 to energize direct current contactor coil DC and to energize low speed contactor coil LO. When energized, direct current contactor coil DC opens its auxiliary contacts DC5 (with no immediate effect) and closes its contacts DC1, DC2, DC3, DC4 to apply direct current to the terminals WH2 and WH1 of winding WH of motor 23. When energized, low speed contactor coil LO opens its auxiliary contact LO4 (with no immediate effect) and closes its contacts LO1, LO2, LO3 to apply alternating current to the terminals WL1, WL2, WL3 of winding WL of motor 23 from the supply line terminals a, b, c, respectively. Motor 23 is thus energized for low speed operation in the hoist direction by a combination of alternating and direct current and exhibits the speed-load characteristics indicated by the lines designated "first point raise" in FIG. 7. Upon opening of push-button contact IR by the operator, contactor and relay conditions shown in FIG. 5 are reinstated, motor 23 is deenergized and brake 24 resets.

Second Point Raise

To proceed to second point raise, the first point contact IR is maintained closed and motor 23 is initially energized as hereinbefore described. Closure by the operator of second point (intermediate) raise push-button contact 2R then energizes relay coil IR which opens its contact IR1 to deenergize direct current contactor coil DC. When deenergized, direct current contactor coil DC closes its auxiliary contact DC5 and opens its contacts DC1, DC2, DC3, DC4 to terminate the supply of direct current to the terminals WH2 and WH1 of winding WH of motor 23. Since contacts LO1, LO2, LO3 are still closed and applying alternating current to the terminals WL1, WL2, WL3 of winding WL of motor 23 from the supply line terminals a, b, and c, respectively, motor 23 is energized for intermediate speed operation in the raise direction only by alternating current in winding WL and exhibits the speed-load characteristics indicated by the lines designated "second point raise" in FIG. 7. Upon opening of push-button contacts 2R and 1R by the operator, contactor and relay conditions shown in FIG. 2A are reinstated, motor 23 is deenergized and brake 24 resets.

Third Point Raise

To proceed to third point raise, the first point contact 1R and the second point contact 2R are maintaind closed and motor 23 is initially energized as hereinbefore described. Closure by the operator of third point (high speed) raise push-button contact 3R energizes time delay relay coil TD1 (an "on" delay relay) which, after a short interval, opens its contacts TD11 to deenergize low speed contactor coil LO and closes its contact TD12 to energize high speed contactor coil HI and to energize time delay coil TD2 (an "off" delay relay). The delays effected by the relays TD1 and TD2 are adjustable, for example, between 0.2 and 1.0 seconds. When deenergized, coil LO opens its contacts LO1, LO2, LO3 to disconnect the terminals WL1, WL2, WL3 of winding WL from the alternating current source. When energized (after a short interval which allows the dc arcs across contact DC1, DC2, DC3, DC4 to extinguish) high speed contactor coil HI closes its contacts H11, H12, H13 to apply alternating current to the terminals WH1, WH2, WH3 of winding WH of motor 23 from the supply terminals a, b, c, respectively. When energized, time delay relay coil TD2 closes its contact TD21 and opens its contact TD22 to prevent reenergization of the coils DC or LO. Motor 23 is thus energized for high speed operation in the raise direction by alternating current only and exhibits the speed-torque characteristics indicated by the lines designated "third point raise" in FIG. 7. Upon opening of push-button contacts 3R, 2R and 1R by the operator, contactor and relay conditions shown in FIG. 5 are reinstated, motor 23 is deenergized and brake 24 resets.

First, Second, and Third Point Lower

Operation of hoist 10 in the first, second, and third point lower modes is similar to that for the corresponding raise modes hereinbefore described, except that the push-buttons 1L, 2L, and 3L are used instead of 1R, 2R, and 3R. It is to be noted, however, that since motor 23 operates in the reverse direction during the lower mode, the raise contacts R1, R2, and R3 and the lower contacts L1, L2, L3 are arranged to effect phase reversal to the appropriate connection terminals on motor 23.

Dynamic Braking

Whenever a transition is made from second point (intermediate speed) operation to first point (low speed) operation, and regardless of whether operation is in the raise or lower modes, deenergization of relay coil IR (effected by opening of whichever push-button contact 2R or 2L was closed) recloses contact IR1 and reenergizes direct current contactor coil DC which recloses its contacts DC1, DC2, DC3, DC4 and reapplies direct current to the terminals WH2 and WH3 of winding WH. This application of direct current to motor 23 has the effect of dynamically (electrically) braking the motor speed in accordance with known dynamic braking principles and eliminates the need to employ the electro mechanical brake 24 to achieve rapid deceleration, thus saving wear and tear on the brake and eliminating additional control circuitry to effect operation of brake 24 at this point in the operational cycle of hoist 10.

Whenever a transition is made from third point (high speed) operation to second point (intermediate speed) operation, and regardless of whether operation is in the raise of lower modes, the coil of the first time delay relay TD1 deenergizes and its contacts TD11 reclose (without delay) and its contact TD12 reopens (without delay). Reopening of relay contact TD12 effects deenergization of high speed contactor coil HI and its contacts H11, H12, and H13 open to disconnect the terminals a, b, and c from motor winding WH. Auxiliary contact H14 also recloses and, since relay contact TD21 remains closed momentarily, direct current coil DC is energized to effect closure of its contact DC1, DC2, DC3, DC4 to reconnect motor winding WH to the direct current supply. Application of direct current to motor winding WH exerts a desirable dynamic braking effect on motor 23 for a short interval of time (until contact TD21 times open) during the transition from third point to second point speed. As contact TD21 reopens, contact TD22 recloses to reenergize contactor coil LO, which then causes its contacts LO1, LO2, LO3 to close and reconnect motor winding WL to the alternating current terminals a, b, c for intermediate speed energization of motor 23.

In the embodiment of the invention disclosed herein, time delay relay TD1 is employed to ensure cessation of direct current flow to motor winding WH before application of alternating current thereto. However, other means could be employed for this purpose and such means are within the scope of the present invention.

OPERATION-FOUR SPEEDS

Referring to FIG. 6, motor 23, brake 24 and the control means thereof operate in the following manner, assuming that the terminals a, b, and c and the transformers T1, T2, and T3 are energized and that all switches and contacts are initially in the condition shown in FIG. 6.

First Point Raise

Figure 8:
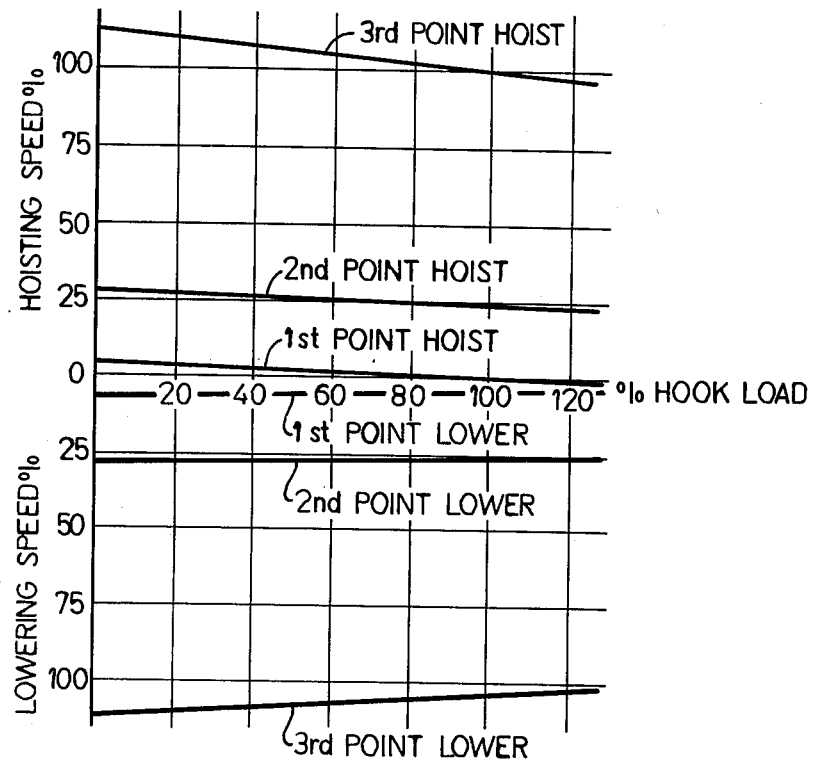

Closure by the operator of first point raise push-button contact 1R energizes raise contactor coil R which closes its hoist contacts R1, R2, R3 with no immediate effect. Coil R also closes its brake contact R4 to energize brake coil 35 and release brake 24 on hoist motor 23. Coil R also opens its auxiliary contact R5 to disable contactor coil L and closes its auxiliary contact R6 to energize direct current contactor coil S1 and to energize low speed contactor coil S12. When energized, direct current contactor coil S1 opens its auxiliary contacts S15 (with no immediate effect) and closes its contacts S11, S12, S13, S14 to apply direct current to the terminals of winding WHH of motor 23. When energized, low speed contactor coil S12 closes its contacts S121, S122, S123 to apply alternating current to winding WL of motor 23 from the supply line terminals a, b, c, respectively. Motor 23 is thus energized for low speed operation in the raise direction by a combination of alternating and direct current and exhibits the speed-load characteristics indicated by the lines designated "First Point Raise" in FIG. 8. Upon opening of push-button contact 1R by the operator, contactor and relay conditions shown in FIG. 6 are reinstated, motor 23 is deenergized and brake 24 resets.

Second Point Raise

To proceed to second point raise, the first point contact 1R is maintained closed and motor 23 is initially energized as hereinbefore described. Closure by the operator of second point raise push-button contact 2R then energizes relay coil RY1 which opens its contact RY11 to deenergize direct current contactor coil S1. When deenergized, direct current contactor coil S1 closes its auxiliary contact S15 and opens its contacts S11, S12, S13, S14 to terminate the supply of direct current to the winding WHH of motor 23. Since contacts S121, S122, S123 are still closed and applying alternating current to the terminals of winding WL of motor 23 from the supply line terminals a, b, and c, respectively, motor 23 is energized for second point speed operation in the raise direction only by alternating current in winding WL and exhibits the speed-load characteristics indicated by the lines designated "Second Point Raise" in FIG. 9. Upon opening of push-button contacts 2R and 1R by the operator, contactor and relay conditions shown in FIG. 6 are reinstated, motor 23 is deenergized and brake 24 resets.

Third Point Raise

To proceed to third point raise, the first point contact 1R and the second point contact 2R are maintained closed and motor 23 is initially energized as hereinbefore described. Closure by the operator of third point raise push-button contact 3R energizes time delay relay coils TD1 and TD3. Coil TD1 (an "on" delay relay) after a short interval, opens its contacts TD11 to deenergized low speed contactor coil S12 and closes its contact TD12 to energize third speed contactor coil S3. Coil TD3 (an "off" delay relay) opens its contacts TD31 (with no immediate effect). The delays effected by the relays TD1 and TD3 are adjustable, for example, between 0.2 and 1.0 seconds. When deenergized, coil S12 opens its contacts S121, S122, S123 to disconnect the terminals of winding WL from the alternating current source. When energized (after a short interval which allows the motor to accelerate on the first speed winding) third speed contactor coil S3 closes its contacts S31, S32, S33 to apply alternating current to the terminals T11, T12, T13 winding WHL of motor 23 from the supply terminals a, b, c, respectively. When energized, time delay relay coil TD3 opens its contact TD31 to prevent reenergization of the S1 for a short interval (after TD3 coil is deenergized). Motor 23 is thus energized for third speed operation in the raise direction by alternating current only and exhibits the speed-torque characteristics indicated by the lines designated "Third Point Raise" in FIG. 9. Upon opening of push-button contacts 3R, 2R, and 1R by the operator, contactor and relay conditions shown in FIG. 6 are reinstated, motor 23 is deenergized and brake 24 resets.

Fourth Point Raise

To proceed to fourth point raise, the first point contact 1R, the second point contact 2R, and the third point contact 3R are maintained closed and motor 23 is initially energized as hereinbefore described. Closure by the operator of fourth point (high speed) raise push-button contact 4R energizes time delay relay coil TD2 (an "on" delay relay) which, after a short interval, opens its contacts TD21 to deenergize third speed contactor coil S3 and closes its contact TD22 to energize high speed contactor coil S4A and consequently high speed contactor S4. The delay effected by the relay TD2 is adjustable, for example, between 0.2 and 1.0 seconds. When deenergized, coil S3 opens its contacts S31, S32, S33 to disconnect the terminals T11, T12, T13 of winding WHL from the alternating current source. Contacts S34 close to allow high speed contactor coil S4A to be energized. When energized (after a short interval which allows the motor to accelerate on the second speed winding) high speed contactor coil S4 closes its contacts S4A1, S4A2, and opens contacts S4A3 (with no immediate effect). S4A4 contacts close to energize high speed contactor coil S4 which closes its contacts S41, S42, S43 to apply alternating current to the terminals T14, T15, T16 of winding WHH of motor 23 from the supply termninals a, b, c, respectively. Motor 23 is thus energized for high speed operation in the raise direction by alternating current only and exhibits the speed-torque characteristics indicated by the lines designated "Fourth Point Raise" in FIG. 9. Upon opening of push-button contacts 4R, 3R, 2R, and 1R by the operator, contactor and relay conditions shown in FIG. 2B are reinstated, motor 23 is deenergized and brake 24 resets.

First, Second, Third and Fourth Point Lower

Operation of hoist 10 in the first, second and third point lower modes is similar to that for the corresponding raise modes hereinbefore described, except that the push-buttons 1L, 2L, 3L, and 4L are used instead of 1R, 2R, 3R, and 4R. It is to be noted, however, that since motor 23 operates in the reverse direction during the lower mode, the raise contacts R1, R2, and R3 and the lower contacts L1, L2, L3 are arranged to effect phase reversal to the appropriate connection terminals on motor 23.

Braking

Regenerative braking from fourth point to third point, from third point to second point and from second point to first point is accomplished by performing the reverse of the heretofore mentioned operations. When a transition from fourth or third point to first point is made, timer contacts TD3A ensure a softer deceleration by inhibiting the DC application to the high speed winding WHH for a short interval.

In the event of the weston-type load brake failure during lowering, this control scheme would limit the hook speed to the second point speed through regenerative braking, provided the operator selected either first or second point speed.

We claim:
1. In combination:
an electric motor comprising a rotor and a stator, said stator comprising at least two stator windings, with one stator winding having a greater number of poles than the other stator winding;
an alternating current source;
a direct current source;
and control means for operating said rotor at any one of a multiplicity of different speeds, said control means comprising:
means for energizing said one stator winding from said alternating current source and simultaneously energizing said other stator winding from said direct current source to effect operation of said rotor at a given speed;
means for deenergizing said other stator winding from said direct current source and for energizing said one stator winding from said alternating current source to effect operation of said rotor at an intermediate speed greater than said given speed;
means for deenergizing said one stator winding from said alternating current source and for energizing another stator winding other than said one stator winding from said alternating current source to effect operation of said rotor at a speed greater than said intermediate speed;
and first time delay means to prevent application of alternating current from said alternating current source to any winding previously energized from said direct current source until arcing ceases between said direct current source and said any winding during transition from one rotor speed to another.

2. A combination according to claim 1 wherein said control means comprises means to momentarily apply direct current from said direct current source to a stator winding during transition from one rotor speed to a lower rotor speed to effect dynamic braking.

3. A combination according to claim 1 wherein said control means comprises means to momentarily apply alternating current from said alternating current source to a stator winding during transition from one rotor speed to a lower rotor speed to effect regenerative braking.

4. In combination:
an electric motor comprising a rotor and a stator defining at least two magnetic circuits, one magnetic circuit comprising at least one low speed stator winding, the other magnetic circuit comprising a low speed stator winding and a high speed stator winding, with said low speed stator winding in said one magnetic circuit having a greater number of poles than either stator winding in said other magnetic circuit;
an alternating current source;
a direct current source;
and control means for operating said rotor at any one of a multiplicity of different speeds, said control means comprising:
means for energizing one of said low speed stator windings from said alternating current source while the other of said low speed windings is deenergized and simultaneously energizing said high speed stator winding in said other magnetic circuit from said direct current source to effect operation of said rotor at a given speed;
means for deenergizing said high speed stator winding in said other magnetic circuit from said direct current source and for energizing said one low speed stator winding from said alternating current source to effect operation of said rotor at an intermediate speed greater than said given speed;
means for deenergizing said one low speed stator winding from said alternating current source and for energizing either of said stator windings in said other magnetic circuit from said alternating current source to effect operation of said rotor at a speed greater than said intermediate speed;
and first time delay means to prevent application of alternating current from said alternating current source to any winding previously energized from said direct current source until arcing ceases between said direct current source and said any winding during transition from one rotor speed to another rotor speed.

5. A combination according to claim 4 wherein said control means comprises means to momentarily apply direct current from said direct current source to said high speed stator winding during transition from one rotor speed to a lower rotor speed to effect dynamic braking.

6. A combination according to claim 4 wherein said control means comprises means to momentarily apply alternating current from said alternating current source to said one low speed stator winding during transition from one rotor speed to a lower rotor speed to effect regenerative braking.

7. In combination:
an electric motor comprising a rotor and a stator defining at least two magnetic circuits, one magnetic circuit comprising at least one low speed stator winding, the other magnetic circuit comprising a low speed stator winding and a high speed stator winding, with said low speed stator winding in said one magnetic circuit having a greater number of poles than either stator winding in said other magnetic circuit;
an alternating current source;
a direct current source;
and control means for operating said rotor at any one of a multiplicity of different speeds, said control means comprising:
means for energizing said low speed stator winding in said one magnetic circuit from said alternating current source while the other of said low speed windings is de-energized and simultaneously energizing said high speed stator winding in said other magnetic circuit from said direct current source to effect operation of said rotor at a given speed;
means for deenergizing said high speed stator winding in said other magnetic circuit from said direct current source and for energizing said low speed stator winding in said one magnetic circuit from said alternating current source to effect operation of said rotor at an intermediate speed greater than said given speed;
means for deenergizing said low speed stator winding in said one magnetic circuit from said alternating current source and for energizing said low speed stator winding in said other magnetic circuit from said alternating current source to effect operation of said rotor at a first speed greater than said intermediate speed;
means for deenergizing said low speed winding in said other magnetic circuit from said alternating current source and for energizing said high speed stator winding in said other magnetic circuit from said alternating current source to effect operation of said rotor at a second speed greater than said first speed;
and first time delay means to prevent application of alternating current from said alternating current source to any winding previously energized from said direct current source until arcing ceases between said direct current source and said any winding during transition from one rotor speed to another rotor speed.

8. A combination according to claim 7 wherein said control means comprises means to momentarily apply direct current from said direct current source to said high speed stator winding in said other magnetic circuit during transition from one rotor speed to a lower rotor speed to effect dynamic braking.

9. A combination according to claim 7 wherein said control means comprises means to momentarily apply alternating current from said alternating current source to said low speed stator winding in said one magnetic circuit during transition from one rotor speed to a lower rotor speed to effect regenerative braking.

* * * * *